US 6,662,862 B1

(12) United States Patent
Lindholm

(10) Patent No.: US 6,662,862 B1
(45) Date of Patent: Dec. 16, 2003

(54) PLATE HEAT EXCHANGER

(75) Inventor: Ingvar Helge Birger Lindholm, Örsjö (SE)

(73) Assignee: Alfa Laval AB, Tumba (SE)

( * ) Notice: Subject to any disclaimer, the term of this patent is extended or adjusted under 35 U.S.C. 154(b) by 0 days.

(21) Appl. No.: 10/031,982

(22) PCT Filed: Jun. 8, 2000

(86) PCT No.: PCT/SE00/01190

§ 371 (c)(1),
(2), (4) Date: Jan. 25, 2002

(87) PCT Pub. No.: WO01/16544

PCT Pub. Date: Mar. 8, 2001

(30) Foreign Application Priority Data

Aug. 27, 1999 (SE) ............................... 9903023

(51) Int. Cl.[7] .............. F28F 3/00; F28F 3/08; F28F 11/00
(52) U.S. Cl. .................. 165/166; 165/167; 165/70
(58) Field of Search ................... 165/167, 166, 165/70, 153, 11.1

(56) References Cited

U.S. PATENT DOCUMENTS

| 4,249,597 | A | * | 2/1981 | Carey .................. 165/166 |
| 4,688,631 | A | * | 8/1987 | Peze et al. ............. 165/166 |
| 4,976,313 | A | | 12/1990 | Dahlgren et al. |
| 5,178,207 | A | * | 1/1993 | Bergqvist et al. ......... 165/70 |
| 5,307,869 | A | * | 5/1994 | Blomgren ............... 165/167 |
| 5,487,424 | A | | 1/1996 | Davison |
| 5,638,899 | A | * | 6/1997 | Blomgren et al. ......... 165/167 |
| 5,913,361 | A | | 6/1999 | Engstrom et al. |

FOREIGN PATENT DOCUMENTS

| DE | 39 03 084 | 8/1990 |
| DE | 41 00 651 | 7/1992 |
| FR | 2 454 075 | 11/1980 |
| WO | WO 91/17404 | 11/1991 |
| WO | WO 91/18253 | 11/1991 |

OTHER PUBLICATIONS

International Search Report.

* cited by examiner

Primary Examiner—Henry Bennett
Assistant Examiner—Tho Duong
(74) Attorney, Agent, or Firm—Fish & Richardson P.C.

(57) ABSTRACT

The present invention concerns a plate heat exchanger for at least two heat exchanging fluids which is permanently joined with at least one sealing portion and has heat transferring plates (1–8), at least two end plates and inlet and outlet organs for the heat exchanging fluids. The core of plates includes alternating heat transferring plates (1–4) and intermediate heat transferring plates (5–8) between the alternating plates. Adjacent plates form a double wall plate unit. The plate elements are permanently joined with each other in a plurality of points having spaced apart areas. For each one of the double wall units, ridges (9) and valleys (16) on the alternating plate (1–4) are in tight contact with the corresponding ridges (9) and valleys (10) on the intermediate plates (5–8) except right at at least one of the points with the spaced apart areas.

9 Claims, 3 Drawing Sheets

PLATE HEAT EXCHANGER

FIELD OF THE INVENTION

The present invention concerns a plate heat exchanger comprising at least one stack of plate elements which plate elements each one has a central heat transferring part and a surrounding edge part. The heat transferring parts of the plate elements are permanently joined with each other in a plurality of spaced apart points and delimit between each other flow spaces for at least two heat exchanging fluids. Each plate element is of a double wall construction and comprises two heat transferring plates of substantially the same size and pressed to substantially the same form which heat transferring plate are in contact with each other but allows a heat exchanging fluid that leaks out through a hole in the one heat transferring plate to be led between the heat transferring plates to the edge parts of the plate elements.

The present invention also concerns a plate heat exchanger for at least two heat changing fluids which heat exchanger is permanently joined with at least one sealing means and comprises at least one core of plates with heat transferring plates, at least two end plates as well as inlet organs and outlet organs for the heat exchanging fluids. The plate package includes alternating heat transferring plates and intermediate heat transferring plates between the alternating plates. Each alternating plate and one of two adjacent intermediate plates form a double wall unit.

BACKGROUND OF THE INVENTION

WO, A1, 91/17404 shows a plate heat exchanger of the kind mentioned above. Alternating plates 15, 17, 19, 21 and intermediate plates 16, 18, 20, 22 alternate in the core of plates, see FIG. 4. Each alternating plate and one of the two adjacent intermediate plates form a double wall unit. Possible fluid leakage through any one of the plates may flow further between the plates in the double wall unit which is closest concerned and out into the environment and thereby being made visible.

Normally double wall units situated next to each other are brazed together among other places in those points where the corrugations on the heat areas of the double wall units are in contacts with each other in the core of plates. It has been evident that as a result of a high temperature and a high pressure one risks at the same time an unwanted joint of the unitary plates being parts of each double wall unit in the corresponding points, right before the contact points mentioned above, or at least in a large number of them. In this way the mentioned further flow between the plates in the closest concerned double wall unit is made difficult in case of fluid leakage.

SUMMARY OF THE INVENTION

The present invention has as an aim to create a plate heat exchanger comprising double wall units which after the brazing together of the core of plates do not show the draw backs mentioned above.

The plate heat exchanger according to the invention thus comprises at least one stack of plate elements which plate elements each one has a central heat transferring part and a surrounding edge part, the heat transferring parts of the plate elements being permanently joined with each other in a plurality of spaced apart points and delimit between each other flow spaces for at least two heat exchanging fluids and whereby each plate element being of a double wall construction and comprising two heat transferring plates of substantially the same size and pressed to substantially the same form which heat transferring plates are in contact with each other but allows a heat changing fluid which leaks out through a hole in the one heat transferring plate to be led between the heat transferring plates to the edge parts of the plate elements.

For each one of the said plate elements the said heat transferring plates are in close contact with each other except right before each one of at least one of the said points with the closest around situated areas.

For each one of the said plate elements the said heat transferring plates may be in close contact with each other except right before each one of the majority of the said points with the closest around situated areas.

Another form of execution of the plate heat exchanger according to the invention is aimed for at least two heat exchanging fluids, is permanently joined with at least one sealing means and comprises at least one core of plates with heat transferring plates, at least two end plates as well as inlet organs and outlet organs for the heat exchanging fluids. The core of plates includes alternating heat transferring plates and intermediate heat transferring plates between the alternating heat transferring plates.

Each one of the said heat transferring plates shows at least one central corrugation pattern with ridges and valleys, at least four flowing through openings forming an inlet channel and an outlet channel through the core of plates for each one of the fluids as well as at least one everything surrounding edge part.

Each one of the said alternating heat transferring plates and a first one of the two respective adjacent intermediate plates create, together with the said sealing means, a channel for flow of one of the heat exchanging fluids from one of the said flowing through openings in one end to another one of the said flowing through openings in the opposite end of the said channel whereby every other one of the said channels lead flow of a first one of the said fluids and at least one of the remaining channels leads flow of a second one of the said fluids so that the said inlet channels and outlet channels for the said first and second fluids respectively are in fluid communication with a first and a second set of channels respectively.

Each one of the said alternating heat transferring plates and said first one of the two respective adjacent intermediate plates create, together with the said sealing means, at least two bypass channels each one pairwise connecting flowing through openings situated right before each other whereby the one flowing through opening in every pair is situated in the said alternating heat transferring plate and the other one in said first intermediate heat transferring plate, in order to lead flow of one of the heat exchanging fluids in bypass by the said channel.

Each one of the said alternating heat transferring plates and a second one of the said two adjacent intermediate plates create a double wall unit formed in such a way that an area between the two plates may create a passage through which fluid leakage through a hole in one of the plates may be led out between the plates to the edge part of the double wall unit in order to be made visible from outside. The said sealing means seals around every pair of flowing through openings situated right before each other, one in the said alternating heat transferring plate and the other in the said second intermediate heat transferring plate in order to create channels through which the fluids may pass each one separately without entering said area between the plates.

For each one of the said double wall units the said ridges and valleys on the said alternating plate are in their whole respective areal extensions adapted to and in near contact with the said corresponding ridges and valleys on the said intermediate plate except right before each one of at least one of those points with closest around situated areas where the ridges and valleys on a double wall unit are in contact with the ridges and valleys on another double wall unit in the core of plates.

The said ridges and valleys on the said alternating plate may for each one of the said double wall units in all of their respective areal extensions be adapted to and in near contact with the said corresponding ridges and valleys on the said intermediate plate except right before each one of the majority of those points with closest around situated areas where ridges and valleys on a double wall unit are in contact with ridges and valleys on another double wall unit in the core of plates.

The characteristics in other respects of the present invention are evident from the following patent claims. Some forms of execution of the invention will be closer described with reference to the accompanying drawings.

DETAILED DESCRIPTION

Figure 1:
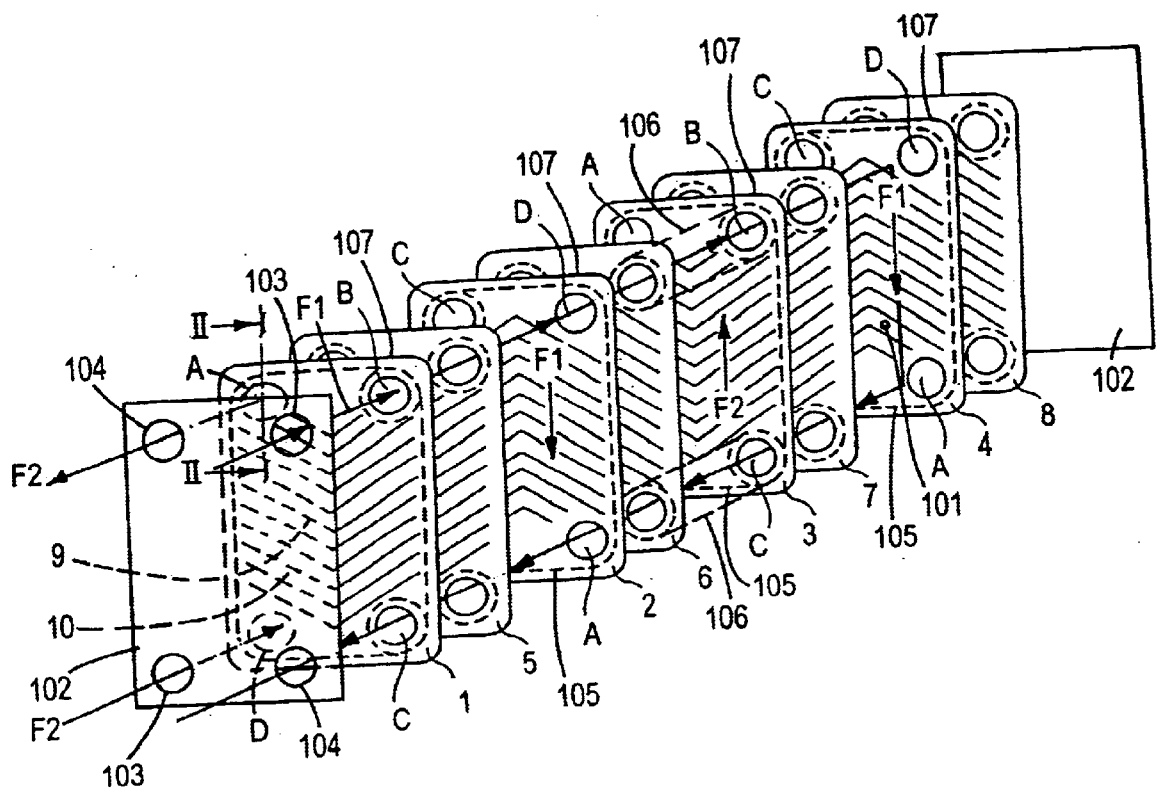
FIG. 1 shows a schematic exploded view of a part of a core of plates being a part of a plate heat exchanger according to the invention.

In FIG. 1 eight in theirselves alike heat transferring plates 1–8 are shown which heat transferring plates are aimed to be parts of a plate heat exchanger according to the invention. The heat transferring plates are co-operating pairwise in such a way that the alternating heat transferring plate 1 are co-operating with the intermediate heat transferring plate 5 and create a first double wall unit, the alternating heat transferring plate 2 co-operates with the intermediate heat transferring plate 6 and create a second double wall unit and so on in an analogical way throughout the core of plates. Every other double wall unit in the core of plates is turned 180 degrees in the respective planes of the plates in relation to the rest of the double wall units.

The heat transferring plates are produced of a thin panel which has been provided with corrugations in the form of ridges 9 and valleys 10 by pressing. The ridges and valleys forms a herring bone pattern on both sides of the so called heat transferring part of each plate.

Each plate is rectangular and has a flowing through opening in each one of its corner parts. Thus the plates 1 and 5 as well as 3 and 7 which all are oriented in the same way have flowing through openings A, B, C and D respectively situated in line with each other at the same time as each one of the plates 2 and 6 as well as 4 and 8 has the corresponding flowing through openings A–D which however are placed in a different way as a result of a turning of these plates 180 degrees in relation to the rest of the plates.

With broken lines in FIG. 1 is illustrated how the different heat transferring plates are aimed to seal against each other when they are permanently joined in a core of plates. Thus it is evident that the plates 1 and 5 in the mentioned first double wall unit is to be joined together and seal against each other only around the flowing through openings A–D. Since the plates 1 and 5 are orientated in the same way in the core of plates the ridges 9 on the plate 5 will be situated in those valleys on the back side of the plate 1 which form the ridges 9 on front side of the plate 1. No heat exchanging fluid will normally flow between the plates 1 and 5. In the corresponding way the plates in the rest of the double wall units is to be sealingly joined with each other only around each one of the flowing through openings A–D.

The plates 5 and 2 which acre oriented in different ways is together to delimit a plate interspace through which a heat exchanging fluid is to flow. The mentioned plates are therefore to be fluid tightly joined together along the edge parts and around two of the flowing through openings of each plate. In FIG. 1 is thus shown a broken line along the edge part of plate 2 around both the heat transferring part and all the four port parts as well as a broken line around the flowing through openings C of the plate. A broken line should also have been shown around the flowing through opening B of the plate but this is hidden behind the plate 5 in FIG. 1.

In the interspace between the plates 5 and 2 the ridges 9 of the plate 2 will cross and contact those ridges on the back side of the plate 5 which are formed by the valleys 10 on the front side of this plate.

The plates 5 and 2 is to be permanently joined in all of those contact points which arise between the ridges contacting each other but between these contact points a flow space is created between the plates. This flow space communicates with openings A and D to the right in the plate 2 (with reference to FIG. 1) and with the openings B and C in the plate 5 situated right before them but the flow space does not communicate with the rest of the openings in these two plates. Flow spaces are present in a corresponding way between all the double wall units.

The flowing through openings A–D of the heat transferring plates create passages through the core of plates for two heat exchanging fluids. With arrows in FIG. 1 it is illustrated how a first fluid F1 is lead into the core of plates via the opening B of the plate 1 and returns via opening C in the same plate as well as how a second fluid F2 is lead into the core via the opening D of the plate 1 and returns via opening A in the same plate. The fluid F1 will during operation of the plate heat exchanger as shown to flow through the spaces between the plates 5 and 2 as well as 7 and 4 in parallel while the fluid F2 will flow through the space between the plates 6 and 3.

In order to create a contact between two port parts on a heat transferring plate, for instance plate 6, and two port parts on an adjacent plate, for instance plate 3, which is turned 180 degrees in its own plane in relation to the first mentioned plate, port parts diagonally occurring on every plate are situated in different planes. Thus the port parts around the openings B and C on the shown side of every plate are situated in the same plan as the tops of the ridges 9 while the port parts around the openings A and D on the other side of the plate are situated in the same plane as the tops of the ridges created on this other side of the plate by the valleys 10.

Figure 2:
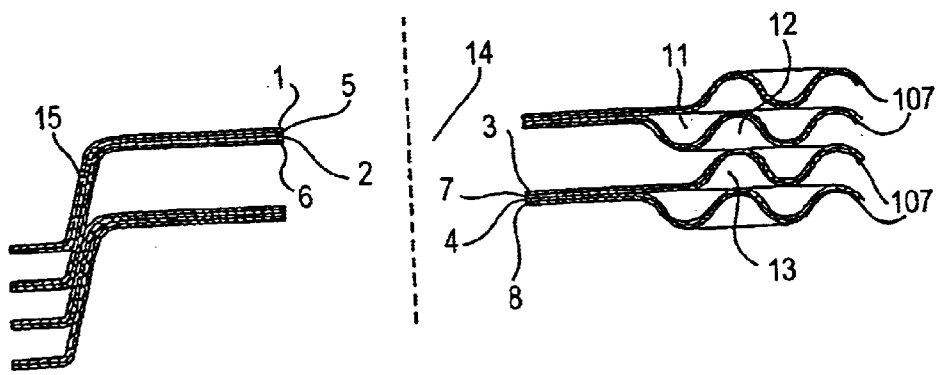
FIG. 2 shows in a cross-section along the line II—II in FIG. 1 the part of the core of plates in FIG. 1 when it is brazed together.

In order to create contact between the edge parts of adjacent plates, of which the one plate is turned 180 degrees in its own plane in relation to the other one, the edge parts of all the plates are bent in same direction so that they are partly overlapping each other, see FIG. 2.

A hole 101 through which heat exchanging fluid may leak is shown, for example, in plate 4. End plates 102 have inlet organs 103 and outlet organs 104, for the heat exchanging fluids. Two bypass channels 106, shown disposed between heat transfer plates 6 and 3, are formed by sealing means 105. If a hole 101 should develop in plate 4, any leakage would pass into a passage 107 between plates 4 and 8 (see FIGS. 1 and 2) and exit the heat exchanger to the outside.

In FIG. 2 a section along the line II—II in FIG. 1 is shown through the plates shown there when these are joined together to what mostly forms a part of a core of plates since the number of heat transferring plates are often larger than eight. The number of heat transferring plates may however be chosen freely after the present heat transferring need and may thus also be less than or equal to eight whereby one should observe that the lowest amount of plates is six if one wants to work with heat exchange between two fluids in a construction with double wall units in order to easier detect leakage than otherwise and fluid flow between end plates (not shown) and heat transferring plates is not wanted.

From FIG. 2 is evident how the plates pairwise, i.e. in every double wall unit, are in contact with each other in something that, in the present cross section, seems to be surface against surface without creating any flow space. As is described below in connection with the FIGS. 3 and 4 the contact is not complete over the whole areas of the respective plates. Adjacent double wall units create in turn between each other elongated channels 11, 12 and 13 for two heat exchanging fluids F1 and F2. The channels 11 and 13 are aimed for the one heat exchanging fluid F1 and the channel 12 is aimed for the other heat exchanging fluid F2. Only the last mentioned channel 12 communicates with the shown passage 14 through the core of plates.

From FIG. 2 is further evident how the plates 1, 5, 2 and 6 as well as the plates 3, 7, 4 and 8 are fluidum tightly joined with each other around the passage 14. At the edge parts 15 of the plates the plates 5 and 2 as well as 6 and 3 as well as 7 and 4 only are fluidum tightly joined while the rest of the plates are just in contact with each other.

Since, which was previously mentioned, the heat transferring plates are provided with corrugations in the form of ridges 9 and valleys 10 which together form a herring bone pattern and since, which also was mentioned earlier, every other double wall unit in the core of plates is turned 180 degrees in the planes of the respective plates in relation to the rest of the double wall units, the corrugations on a double wall unit will be in contact with the corrugations on adjacent double wall units in the core of plates tin a plurality of points. When brazing the core of plates together also these points are brazed together.

Figure 3:
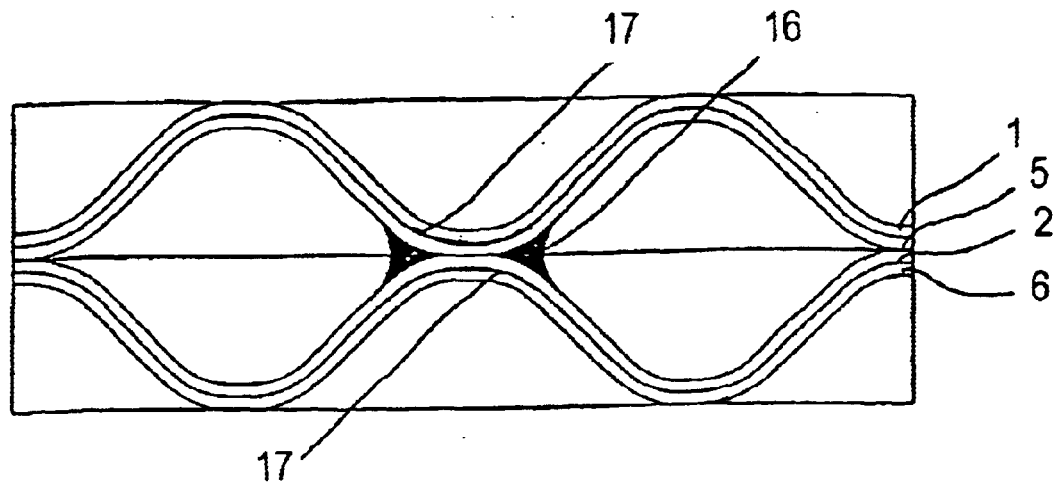
FIG. 3 shows in a cross-section along a line which is in parallel with the line II—II in FIG. 1 a brazed together point of connection between two double wall units according to the prior art.
Figure 5:
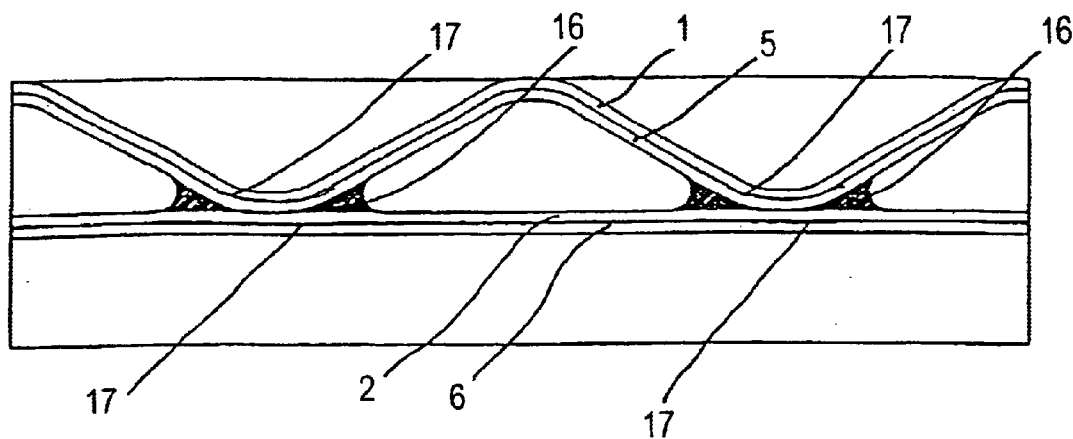
FIG. 5 shows in a cross-section along a line which is in parallel with ridges and valleys on a double wall unit two brazed together contact-points between two double wall units according to the prior art.

If the double wall unit according to the prior art is thereby used, i.e. such double wall units where the ridges and valleys on each one of the alternating plates in all of their areal extensions respectively are adapted to and in near contact with the corresponding ridges and valleys on the respective intermediate plates the result is often that which is evident from the FIGS. 3 and 5 which show a cross section through such a brazed together point of contact and a cross section through two such points respectively.

From the FIGS. 3 and 5 it is evident that in addition to the wanted brazing joint 16 between the two double wall units shown in each one of the figures, the double wall units consisting of on one hand the alternating plate 1 and the intermediate plate 5 as well as on the other hand the alternating plate 2 and the intermediate plate 6, an unwanted joint 17 between the plates in each one of the double wall units is present. Each one of the said unwanted joints 17 has been created right before the brazing joint 16, i.e. as closed to this brazing joint 16 as it is possible to get without leaving the space between the plates in the respective double wall unit. The brazing joint 16 as well as the joints 17 have a certain areal extension over the corrugation pattern of the respective plates. Thereby one should observe that the joints 17 each one often has a somewhat smaller areal extension than the brazing joint 16.

According to the invention double wall units are used instead where the ridges and valleys on each one of the alternating plates over the larger part of their respective areal extensions are adapted to and in near contact with the corresponding ridges and valleys on the intermediate plates respectively. Right before each one of the majority of (i.e. more than half the number of), or most preferably all those points with the closest around situated areas where the ridges and valleys on a double wall unit are in contact with the ridges and valleys on another double wall unit the mentioned adaptation add near contact is not present. At brazing together the core of plates the result will be what is evident from the FIGS. 4 and 6 which show a cross section through a brazed together contact point and a cross section through two such points respectively.

Figure 4:
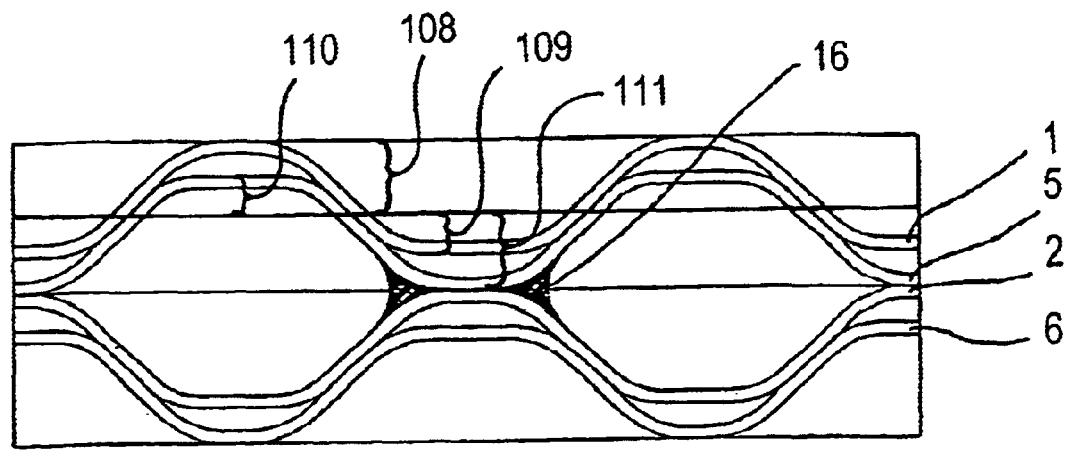
FIG. 4 shows in cross-section along a line which is in parallel with the line II—II in FIG. 1 a brazed together contact point between two double wall units according to the invention.
Figure 6:
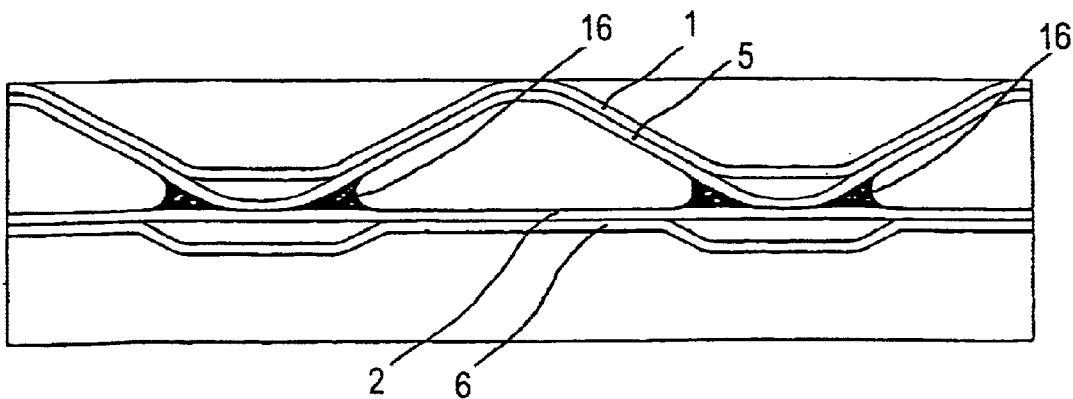
FIG. 6 shows in a cross-section along a line which is in parallel with ridges and valleys on a double wall unit two brazed together contact points between two double wall units according to the invention.

From the FIGS. 4 and 6 is evident that in addition to the wanted brazing joint 16 between the two shown double wall units in each one of the figures, composed of on one hand the alternating plate 1 and the intermediate plate 5 as well as on the other hand the alternating plate 2 and the intermediate plate 6, no other joint is present, i.e. no unwanted joint between plates in any double wall unit. The areal extension (in the main plane of extension of the plates) for each one of the said closest around situated areas, i.e. those areas where the plates in the respective double wall unit are not in close contact with each other may be just as large as the average areal extension for each one of the wanted brazing joints 16.

The ridges of each one of the alternating plates may in a mode of execution show a pressing depth 108 which is larger than the pressing depth 109 for the valleys at the same plates at the same time as the ridges of each one of the intermediate plates show a pressing depth 110 which is smaller than the pressing depth ill for the valleys on the same plates.

The ridges on each one of the alternating plates may, in another mode of execution, show a pressing depth which is smaller than the pressing depth for the valleys on the same plates at the same time as the ridges on each one on the intermediate plates show a pressing depth which is larger than the pressing depth for the valley on the same plates.

The said sealing means may consist of one or several soldered or brazed joints in the form of points, seams, strings and/or areas comprising a copper based solder. The present double wall unit may however also be used in combination with any other permanent sealing means such as for example welded or glued joints in the form of points, seams, strings and/or areas. At soldering or brazing also other soldering materials may be utilized such as for example a nickel based solder.

By the described difference between the plates in each double wall unit when it comes to the geometry of the cross section an unwanted joint of plates is thus avoided at the brazing together of the core of plates which leads to the result that the double wall effect when it comes to signal a possible leakage is kept. At the same time it is possible to avoid a crack formation which may otherwise occur in double wall units as a result of stress concentrations in the areas for unwanted joints. One also avoids by creation of the described difference of geometry a time consuming element of work in the form of local treatment with a brazing preventing agent before the brazing together of the core of plates of a large amount of from each other separated areas on that side of all the plates which is to be turned inwardly in the double wall units which method is otherwise thinkable as an alternative.

The invention is not restricted to the forms of execution shown here but may be varied in accordance with following patent claims.

What is claimed is:

1. A plate heat exchanger comprising at least one stack of plate elements each of which plate elements has a central heat transferring part and a surrounding edge part (15), the heat transferring parts of the plate elements being permanently joined with each other in a plurality of points having spaced apart areas and between each other limiting flow spaces for at least two heat exchanging fluids (F1, F2) and each plate element being of a double wall construction comprising two heat transferring plates (1, 5; 2, 6; 3, 7; 4, 8) of substantially the same size and pressed to substantially the same form which heat transferring plates are in contact with each other but allow a heat exchanging fluid (F1, F2) that is leaking out through a hole (101) in one of the two heat transferring plates (1, 5; 2, 6; 3, 7; 4, 8) to be led between the heat transferring plates to the edge parts (15) of the plate elements, wherein for each one of the plate elements the heat transferring plates (1, 5; 2, 6; 3, 7; 4, 8) are tightly in contact with each other except right at at least one of the points with spaced apart areas.

2. A plate heat exchanger according to claim 1, wherein for each one of the plate elements the heat transferring plates (1, 5; 2, 6; 3, 7; 4, 8) are tightly in contact with each other except right at a majority of the points with the spaced apart areas.

3. A plate heat exchanger for at least two heat exchanging fluids (F1, F2) which is permanently joined in a plurality of points having spaced apart areas with at least one sealing means and comprises at least one core of plates with heat transferring plates (1–8), at least two end plates (102) as well as inlet organs (103) and outlet organs (104) for the heat transferring fluids (F1, F2) and at which the core of plates includes alternating heat transferring plates (1–4) and intermediate heat transferring plates (5–8) between the alternating heat transferring plates (1–4), each one of the heat transferring plates (1–8) shows at least one central corrugation pattern with ridges (9) and valleys (10), at least four flowing through openings (A–D) forming an inlet channel and an outlet channel (14) through the core of plates for each one of the fluids (F1, F2) as well as at least one everything surrounding edge part (15), an alternating heat transferring plate (1–4) and a corresponding first intermediate plate (5–8) that is positioned adjacent to the alternating heat transferring plate (1–4) form, together with said sealing means (105), a channel (11–13) for flow of one of the heat exchanging fluids (F1, F2) from one of the flowing through openings (A–D) in one and to another one of the flowing through openings (A–D) in the opposite end of the channel (11–13), whereby every other one of the channels (11, 13) leads flow of a first one (F1) of the fluids and at least one of the remaining channels (12) leads flow of a second one (F2) of the fluids, so that the inlet channels and outlet channels (14) for the first (F1) and second (F2) fluids respectively are in fluid communication with a first and a second set of channels respectively (11–13), the alternating heat transferring plate (1–4) and the first adjacent intermediate plate (5–8) form, together with said sealing means (105), at least two bypass channels (106) which each one pairwise connects flowing through openings (A–D) situated right before each other, one flowing through opening (A–D) in each pair being situated in the alternating heat transferring plate (1–4) and the other in the first intermediate heat transferring plate (5–8) to lead a flow of one of the heat exchanging fluids (F2, F1) in bypass by the channel (11–13), the alternating heat transferring plate (1–4) and a second intermediate plate (5–8) that is positioned adjacent the alternating heat transferring plate opposite the first adjacent intermediate plate, form a double wall unit designed in such a way that a space between the two plates (1, 5; 2, 6; 3, 7; 4, 8) forms a passage (107) through which fluid leakage through a hole (101) in one of the plates (1, 5; 2, 6; 3, 7; 4, 8) may be led out between the plates to the edge part of the double wall unit in order to make it visible from outside, the sealing means sealing around every pair of right before each other situated flowing through openings (A–D), one in said alternating heat transferring plate (1–4) and the other in the second intermediate heat transferring plate (5–8), in order to form channels through which the fluids (F1, F2) may pass each one separately without entering the space between the plates, wherein for each one of the double wall units the ridges (9) and valleys (10) on the alternating plate (1–4) in a whole of their respective areal extensions am adapted to and in close contact with the corresponding ridges (9) and valleys (10) on the intermediate plate (5–8) except right at at least one of the points with spaced apart areas, where the ridges (9) and the valleys (10) on a double wall unit are in contact with the ridges (9) and valleys (10) on another double wall unit in the core of plates.

4. A plate heat exchanger according to claim 3, at which for each one of the double wall units the ridges (9) and valleys (10) on the alternating plate (1–4) in all of their respective areal extensions are adapted to and in close contact with the corresponding ridges (9) and valleys (10) on the intermediate plate (5–8) except right at a majority of the points with the spaced apart areas where the ridges (9) and the valleys (10) on a double wall unit are in contact with the ridges (9) and valleys (10) on another double wall unit in the core of plates.

5. A plate heat exchanger according to claim 3, at which an areal extension for each one of the spaced apart areas is at least as large as an average areal extension for each one of a plurality of brazing joints (16) uniting two double wall units where the ridges (9) and valleys (10) on one double wall unit are in contact with the ridges (9) and valleys (10) on another double wall unit in the core of plates.

6. A plate heat exchanger according to claim 3, at which for each one of the double wall units and in each one of the spaced apart areas the ridges (9) on the alternating plate (1–4) show a pressing depth (108) which is larger than the pressing depth (109) for the valleys (10) on the same plate at the same time as the ridges (9) on the intermediate plate (5–8) show a pressing depth (110) which is smaller than the pressing depth (111) for the valleys (10) on the same plate.

7. A plate heat exchanger according to claim 7, at which for each one of the double wall units and in each one of the spaced apart areas the ridges (9) on the alternating plate (1–4) show a pressing depth which is smaller than the pressing depth for the valleys (10) on the same plate at the same time as the ridges (9) on the intermediate plate (5–8) show a pressing depth which is larger than the pressing depth for valleys (10) on the same plate.

8. A plate beat exchanger according to claim 3, at which the scaling means consists of at least one soldered or brazed joint in the form of a point, seam, string and/or area.

9. A plate heat exchanger according to claim 8, at which the soldered or brazed joint comprises a copper based soldering material.

* * * * *